United States Patent
Magoshi

(10) Patent No.: US 6,816,946 B2
(45) Date of Patent: Nov. 9, 2004

(54) METHODS AND APPARATUS FOR CONTROLLING A CACHE MEMORY

(75) Inventor: Hidetaka Magoshi, Palo Alto, CA (US)

(73) Assignee: Sony Computer Entertainment, Inc. (JP)

( * ) Notice: Subject to any disclaimer, the term of this patent is extended or adjusted under 35 U.S.C. 154(b) by 207 days.

(21) Appl. No.: 10/187,072

(22) Filed: Jul. 1, 2002

(65) Prior Publication Data

US 2004/0003178 A1 Jan. 1, 2004

(51) Int. Cl.$^7$ .............................................. G06F 12/08

(52) U.S. Cl. ..................................... 711/137; 711/217

(58) Field of Search .............................. 711/137, 173, 711/217

(56) References Cited

U.S. PATENT DOCUMENTS

| | | | | |
|---|---|---|---|---|
| 5,588,138 A | * | 12/1996 | Bai et al. ..................... | 711/173 |
| 5,752,037 A | * | 5/1998 | Gornish et al. ............. | 717/160 |
| 6,629,188 B1 | * | 9/2003 | Minkin et al. ................ | 711/3 |
| 2003/0065889 A1 | * | 4/2003 | Kamitani et al. ........... | 711/137 |
| 2003/0154349 A1 | * | 8/2003 | Berg et al. ................... | 711/137 |
| 2003/0208660 A1 | * | 11/2003 | van de Waerdt ............ | 711/137 |

OTHER PUBLICATIONS

Igehy H. et al., "Prefetching in a Texture Cache Architecture", Proceedings of the 1998 Eurographics/Siggraph Workshop on Graphics Hardware, Aug. 31, 1998, pp. 133–142.

Hakura, Z. S. et al., "The Design and Analysis of a Cache Architecture for Texture Mapping", 24th Annual International Symposium on Computer Architecture, Jun. 2, 1997, pp. 108–120.

McCormack, J. et al., "Tile Polygon Traversal Using Half-–Plane Edge Functions", Proceedings of 2000 Siggraph/Eurographics Workshop on Graphics Hardware, Aug. 21, 2000, pp. 15–21.

Zhong, Wang et al., "Scheduling and Partitioning for Multiple Loop Nests", 14th International Symposium on System Synthesis, Sep. 30, 2001, pp. 183–188.

* cited by examiner

*Primary Examiner*—Hiep T. Nguyen
(74) *Attorney, Agent, or Firm*—Lerner, David, Littenberg, Krumholz & Mentlik, LLP

(57) ABSTRACT

Methods and apparatus enable: the partitioning of a main memory into a plurality of blocks, each block being adjacent to at least one of the other blocks, and each block including a plurality of data units containing one or more bits of data; the partitioning of each block of the main memory into a plurality of zones, each zone containing one or more of the data units; the association of at least some of the respective zones of each given block with respective others of the adjacent blocks to the given block; and the pre-fetching of a given one of the other blocks into a cache memory when any one of the data units within any of the associated zones of that block is addressed.

16 Claims, 7 Drawing Sheets

METHODS AND APPARATUS FOR CONTROLLING A CACHE MEMORY

BACKGROUND OF THE INVENTION

The present invention relates to methods and apparatus for controlling a cache memory and, more particularly, to methods and apparatus for pre-fetching data into the cache memory.

In recent years, there has been an insatiable desire for faster computer processing data throughputs because cutting-edge computer applications are becoming more and more complex, and are placing ever increasing demands on microprocessing systems. Graphics applications are among those that place the highest demands on a microprocessing system because they require such vast numbers of data accesses, data computations, and data manipulations in relatively short periods of time to achieve desirable visual results. Conventional microprocessors have very rapid cycle times (i.e., the unit of time in which a microprocessor is capable of manipulating data), such as two nanoseconds, although the time required to access data stored in main memory may be considerably higher than the cycle time of the microprocessor. For example, the access time required to obtain a byte of data from a main memory implemented using dynamic random access memory (DRAM) technology is on the order of about 60 nanoseconds.

In order to ameliorate the bottleneck imposed by the relatively long access time to DRAM memory, those skilled in the art have utilized cache memories. Cache memory is significantly faster than DRAM memory, and augments the function of data storage provided by the main memory. For example, an L2 cache memory may be coupled externally to the microprocessor or an L1 cache memory may be coupled internally with the microprocessor, which memories are significantly faster than a main memory implemented utilizing DRAM technology. An L2 cache memory may be implemented utilizing, for example, static random access memory (SRAM) technology, which is approximately two to three times faster than DRAM technology. An L1 cache memory is even faster than an L2 cache memory.

Due to the relatively high cost of cache memories, they are typically much smaller than main memory. Consequently, conventional algorithms have been employed to determine what data should be stored in the cache memory. These conventional algorithms may be based on, for example, the theoretical concept of "locality of reference," which takes advantage of the fact that relatively small portions of a very large executable program are used at any particular point in time. Thus, in accordance with the concept of locality of reference, only the small portions of the overall executable program are stored in cache memory at any particular point in time.

The particularities of the known algorithms for taking advantage of locality of reference, or any other concept, for controlling the storage of data in a cache memory are too numerous to present in this description. Suffice it to say, however, that any given algorithm may not be suitable in all applications as the data processing goals of various applications may differ significantly.

In graphics applications, for example, strong data storage localities may exist in main memory, which localities are a function of the coordinates of pixel data within main memory. More particularly, the main memory utilized in a graphics application may be conceptually organized into a two-dimensional plane, where the information for each pixel in an image is stored at a particular X, Y coordinate. The main memory utilized in a graphics application may be further organized into a plurality of rectangular blocks, where each block contains the information for a plurality of pixels. The addressing of the pixels within a particular block may be highly linear, i.e., the access to the pixel information may be highly sequential within a given rectangular block.

Thus, conventional algorithms for controlling a cache memory in a graphics application typically dictate that a given cache line stores the pixel information for an entire rectangular block. When a cache hit occurs (i.e., when a memory access request for a particular byte of data can be satisfied by accessing the cache memory), the high linearity of the pixel information within the given rectangular block is likely to result in a cache hit for the next data access request. On the other hand, when a cache miss occurs (i.e., the memory access request for a particular byte of data cannot be satisfied by accessing the cache memory), all of the pixel information within the rectangular block in which the desired byte of data is located is read from main memory and stored in the cache memory. Unfortunately, these conventional algorithms do not adequately exploit the characteristics associated with the linearity and strong localities of memories used in graphics applications. Indeed, such algorithms result in an undesirable number of cache misses and, therefore, result in less efficient memory control, lower processing throughput, and inferior graphics imaging.

Accordingly, there are needs in the art for new methods and apparatus for controlling an overall memory, including a cache memory, that exploit the linearity and strong localities exhibited in memories used in graphics applications in order to improve memory efficiency, increase processing throughput, and improve the quality of graphics images.

SUMMARY OF THE INVENTIONS

In accordance with at least one aspect of the present invention, an apparatus for controlling a memory includes: a main memory partitioned into a plurality of two-dimensional blocks, each block including a plurality of data units containing one or more bytes of data, and each given block being partitioned into a plurality of zones, each zone containing one or more of the data units and at least some of the zones being associated with a respective block adjacent to the given block; an address decoder operable to receive addresses to the bytes of data in the main memory, and to decode the addresses to determine in which zones the respective data bytes are located; and a pre-fetch address generator operable to generate a request to pre-fetch the blocks that are associated with respective zones into a cache memory when the address decoder receives addresses to bytes of data located in the respective zones.

By way of example, each of the blocks may include at least one of: a left boundary common with a left adjacent block, a right boundary common with a right adjacent block, an upper boundary common with an upper adjacent block, and a lower boundary common with a lower adjacent block. Further, each of the blocks may include at least one of: a left zone associated with the left adjacent block and including at least one data unit disposed along the left boundary, a right zone associated with the right adjacent block and including at least one data unit disposed along the right boundary, an upper zone associated with the upper adjacent block and including at least one data unit disposed along the upper boundary, and a lower zone associated with the lower adjacent block and including at least one data unit disposed along the lower boundary.

Utilizing this partitioning: the left zone may be defined at least in part by a left dividing line extending from the upper boundary to the lower boundary, the left zone including at least some of the data units located between the left boundary and the left dividing line; the right zone may be defined at least in part by a right dividing line extending from the upper boundary to the lower boundary, the right zone including at least some of the data units located between the right boundary and the right dividing line; the upper zone may be defined at least in part by an upper dividing line extending from the left boundary to the right boundary, the upper zone including at least some of the data units located between the upper boundary and the upper dividing line; and the lower zone may be defined at least in part by a lower dividing line extending from the left boundary to the right boundary, the lower zone including at least some of the data units located between the lower boundary and the lower dividing line.

Preferably, the left, right, upper, and lower dividing lines correspond to certain bits of the addresses, and the address decoder is operable to decode the addresses to determine in which zones the respective data bytes are located based on the certain bits.

By way of example, each block may include a central zone containing the one or more data units located between the left, right, upper, and lower dividing lines; and the central zone is preferably not associated with any adjacent block. Preferably, each block further includes at least one of: an upper left zone containing the data units located between the left boundary, the upper boundary, the upper dividing line, and the left dividing line (and the upper left zone is not associated with any adjacent block); a lower left zone containing the data units located between the left boundary, the lower boundary, the lower dividing line, and the left dividing line (and the lower left zone is not associated with any adjacent block); an upper right zone containing the data units located between the right boundary, the upper boundary, the upper dividing line, and the right dividing line (and the upper right zone is not associated with any adjacent block); and a lower right zone containing the data units located between the right boundary, the lower boundary, the lower dividing line, and the right dividing line (and the lower right zone is not associated with any adjacent block).

In accordance with at least one further aspect of the present invention, a method includes: partitioning a main memory into a plurality of two-dimensional blocks, and partitioning each block into a plurality of data units containing one or more bytes of data; partitioning each block of the main memory into a plurality of zones, each zone containing one or more of the data units; associating at least some of the respective zones of each block with others of the blocks; and pre-fetching at least a portion of one of the other blocks into a cache memory when any one of the data units within any of the associated zones of that block is addressed.

Preferably, each of the at least some zones of each block is associated with one adjacent block. Further, at least one zone of each block is preferably disposed along a boundary between the given block and an associated, adjacent block.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION

Figure 1:
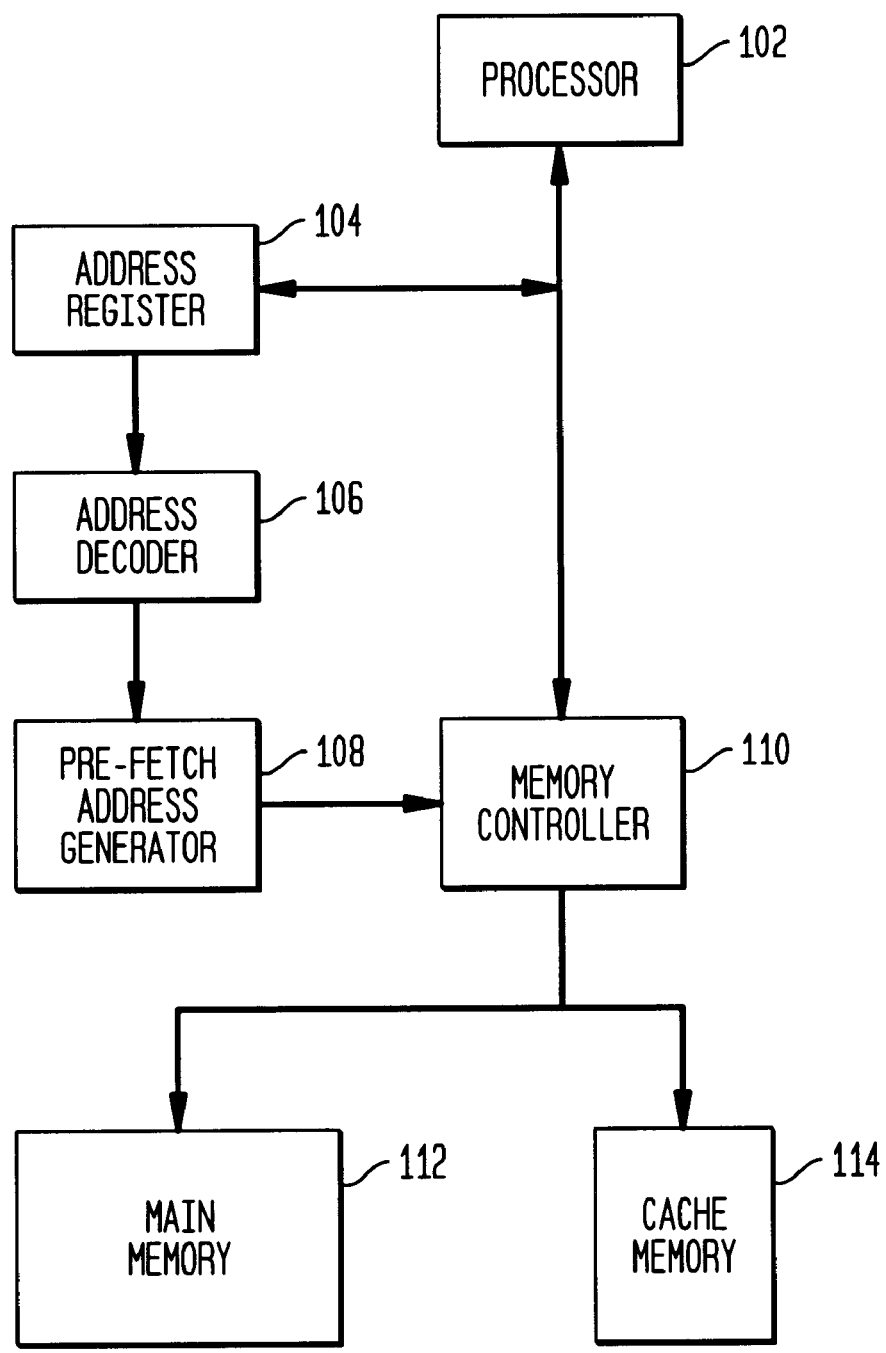
FIG. 1 is a block diagram showing aspects of an apparatus (and/or aspects of a method) suitable for controlling a memory in accordance with one or more aspects of the present invention.

With reference to the drawings, wherein like numerals indicate like elements, there is shown in FIG. 1 an apparatus and/or aspects of a method suitable for controlling a memory in accordance with the present invention. For the purposes of brevity and clarity, the block diagram of FIG. 1 will be referred to and described herein as illustrating an apparatus 100, it being understood, however, that the description may readily be applied to various aspects of a method with equal force. The apparatus 100 preferably includes a processor 102, an address register 104, an address decoder 106, a pre-fetch address generator 108, a memory controller 110, a main memory 112, and a cache memory 114.

The processor 102 may be implemented utilizing any of the known technologies that are capable of requesting data from the main memory and/or the cache memory 114, and manipulating the data to achieve a desirable result. For example, the processor 102 may be implemented using any of the known microprocessors that are capable of executing software and/or firmware, including standard microprocessors, distributed microprocessors, etc. By way of example, the processor 102 may be a graphics processor that is capable of requesting and manipulating data, such as pixel data, including gray scale information, color information, texture data, polygonal information, video frame information, etc.

The processor 102 preferably provides a data access request, such as a memory address, to the address register 104 and the memory controller 110. The address decoder 106 and the pre-fetch address generator 108 are preferably operable to provide further information to the memory controller 110 to achieve desirable results in terms of managing the information stored in the cache memory 114 vis-a-vis the main memory 112. In order to more fully describe the details of this interaction of the various functional blocks of the apparatus 100, further reference will be made to FIGS. 2–5.

Figure 2:
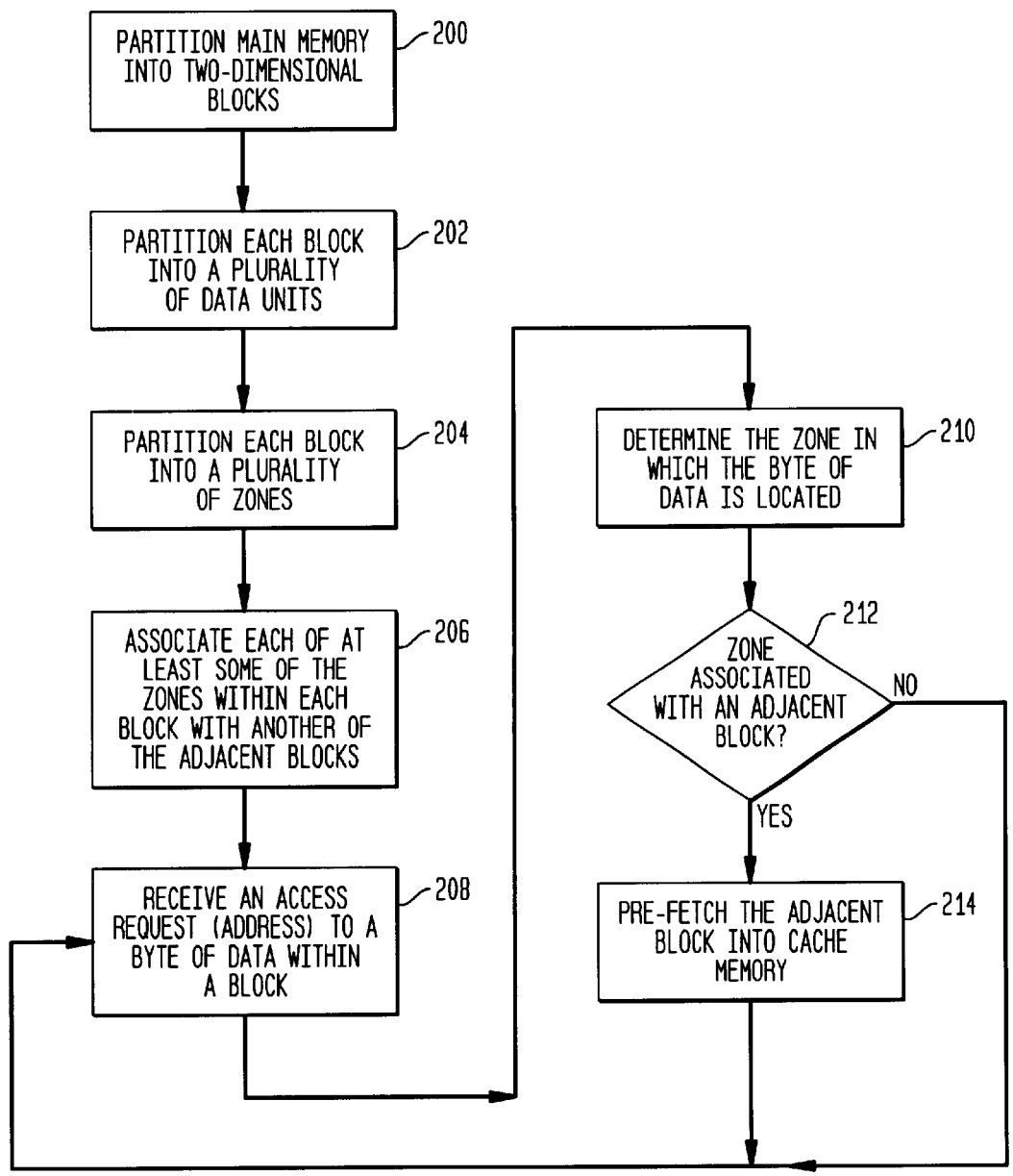
FIG. 2 is a flow diagram illustrating certain actions/functions that may be carried out and/or implemented in accordance with one or more aspects of the present invention, such as those illustrated in FIG. 1.

FIG. 2 is a flow diagram illustrating certain actions/functions that may be carried out and/or implemented in accordance with the functional blocks illustrated in FIG. 1. At action 200, the main memory 112 (FIG. 1) is preferably partitioned into a plurality of two-dimensional data blocks. It is understood that the partitioning of the main memory 112 is in large measure a conceptual exercise in that the main memory 112 need not be physically partitioned; rather, the main memory 112 is functionally partitioned via-a-vis the data storage and data access carried out by the various functional blocks of the apparatus 100.

Figure 3:
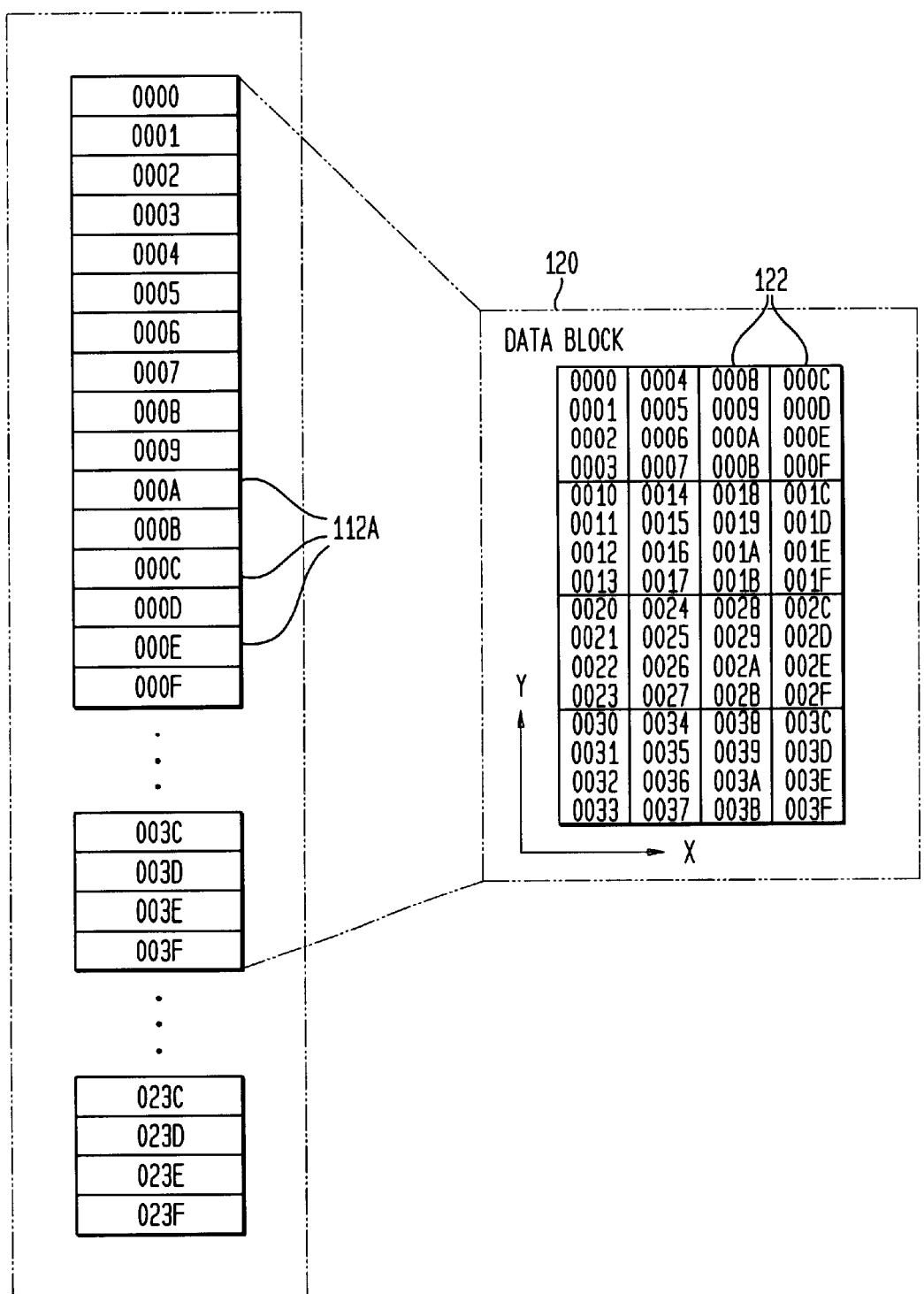
FIG. 3 is a conceptual block diagram illustrating certain features of a memory that may be utilized in connection with the apparatus (and/or method aspects) shown in FIG. 1.

More particularly, and with reference to FIG. 3, the main memory 112 is preferably implemented utilizing any of the known technologies, such as DRAM, which includes a plurality of data storage locations 112A. For the purposes of the illustration, each data location 112A represents one byte of data, where each byte includes, for example, 8-bits, 16-bits, 32-bits, 64-bits, etc. The data storage locations 112A are labeled by way of their hexadecimal address, namely, 0000, 0001, 0002, ... 003F, ... 023F. For the purposes of this example, the main memory 112 shown in FIG. 3 includes 1,024 data storage locations 112A, where each location 112A is capable of storing one byte of data. It is understood that the size of the main memory 112 is given by way of example only and is not intended to limit the scope of the invention.

Turning again to action 200 of FIG. 2, where the main memory 112 is partitioned into two-dimensional data blocks 120, and with further reference to FIG. 3, the data storage locations 112A of the main memory 112 are preferably organized into a data block 120 containing, for example, all of the pixel information (i.e., bytes of data) stored at addresses 0000–003F. It is further assumed, for the purposes of discussion, that the information necessary to represent one pixel of the image requires four bytes of data (e.g., one byte for gray scale, one byte for color, etc.) Therefore, in this example the memory 112 illustrated in FIG. 3 is capable of storing information relating to 144 pixels. Each of the data blocks 120 contains the information relating to a subset of the 144 pixels stored in the main memory 112. Each data block 120 is preferably a two-dimensional rectangular block in which the information relating to the respective subset of pixels is located on an X, Y Cartesian coordinate system.

With reference to FIGS. 2 and 3, at action 202 (FIG. 2), each data block 120 is preferably partitioned into a plurality of data units 122 (FIG. 3), where each data unit 122 contains the information relating to a respective one of the pixels. In keeping with the above example, each data unit 122 illustrated in FIG. 3 includes four bytes of data. Among the many ways in which the data units 122 may be organized in accordance with the invention, it is preferred that the data units 122 are sequentially organized from left to right and top to bottom such that a linear sequence is established according to a zig-zag pattern. In this way, the bytes of data flow in the following address sequence: 0000, 0001, 0002, 0003 (in a first data unit 122), 0004, 0005, 0006, 0007 (in a next data unit 122), etc. Subsequent bytes of data in subsequent data units 122 continue flowing left to right (X direction), top to bottom (Y direction) throughout the data block 120.

Figure 4:
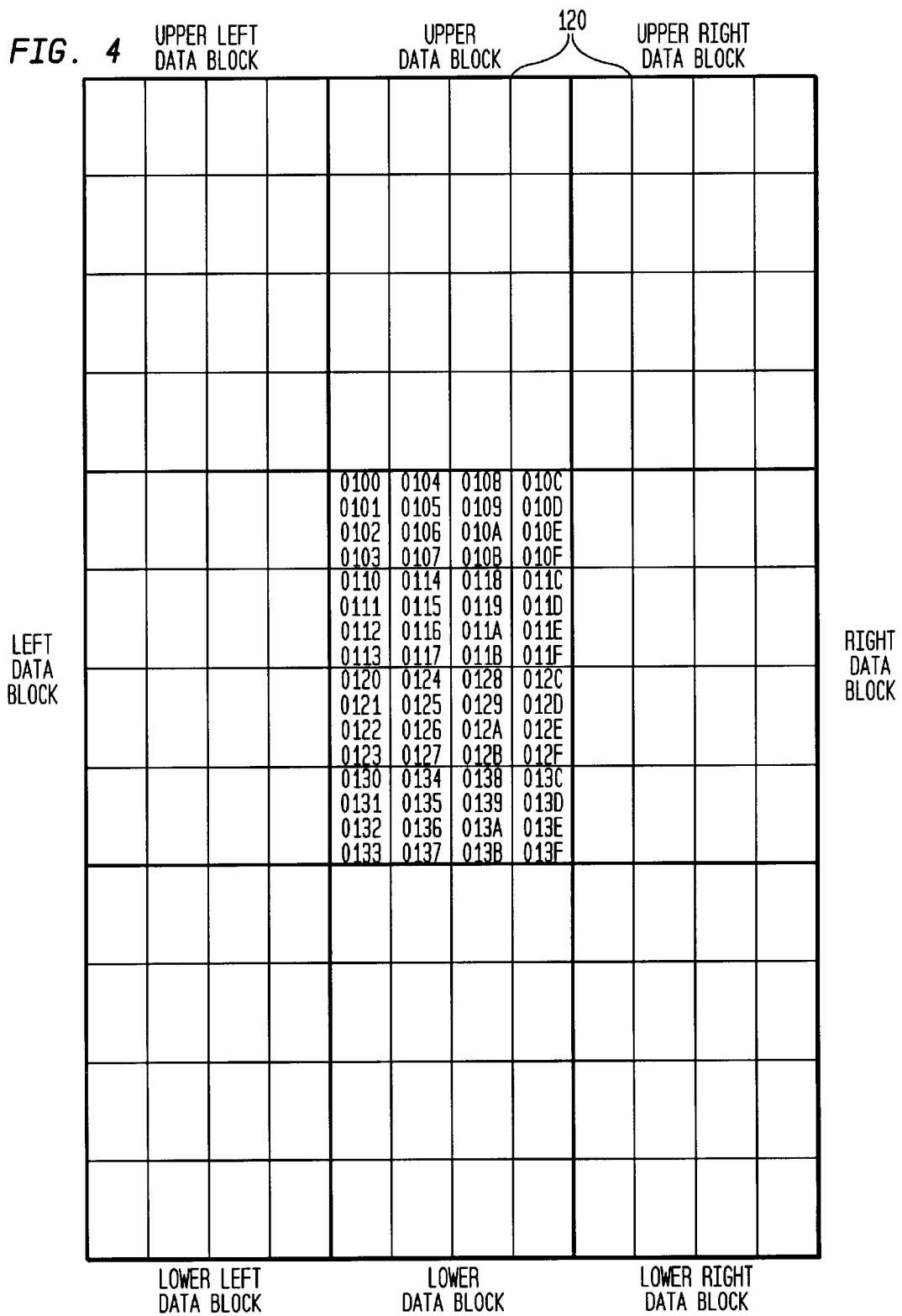
FIG. 4. illustrates further conceptual details of the memory of FIG. 3.

As illustrated in FIG. 4, information relating to other groups of pixels within the main memory 112 are preferably partitioned into further data blocks 120, which data blocks 120 are disposed in the two-dimensional X, Y grid. In keeping with the example above, this creates nine data blocks 120 including a central block (not labeled), an upper left data block, and upper data block, an upper right data block, a left data block, a right data block, a lower left data block, a lower data block, and a lower right data block. Assuming that the upper left data block 120 (i.e., the data block 120 illustrated in FIG. 3) represents the information relating to the bytes of data stored in addresses 0000–003F, then the central block illustrated in FIG. 4 contains pixel information stored at addresses 0100–013F of the main memory 112.

Assuming that the algorithm employed by the memory controller 110 dictates that a given cache line within the cache memory 114 stores the pixel information for an entire data block 120, when the processor 102 requests the data byte stored at, for example, address 0114 (within the central block of FIG. 4) and the cache memory 114 does not contain the pixel information associated with the central block, a cache miss will occur. Consequently, the memory controller 110 preferably reads the pixel information from main memory 112 stored at addresses 0100–013F and stores same in the cache memory 114.

In keeping with the above example, the next data access request will probably be the data byte stored in memory location 0115, which will have already been stored in the cache memory 114, resulting in a cache hit. Further, assuming that the processor 102 has requested all of the bytes of data stored at addresses 0114–0117 (i.e., the addresses within the same data unit 122), the next data access request might or might not be within the central data block 120. Indeed, the next data request might be for a byte of data within an adjacent data block 120, such as the upper left data block 120, the upper data block 120, the upper right data block 120, etc. If, in fact, the next byte of data is located in an adjacent data block 120 which has not previously been stored in the cache memory 114, then a cache miss will occur.

The present invention contemplates methods and apparatus for increasing the cache hit rate by pre-fetching one or more adjacent data blocks 120 into the cache memory 114 based on a data request in a different data block. To achieve this result, in action 204 (FIG. 2), each data block 120 is preferably partitioned into a plurality of zones, where each zone contains one or more data units 122.

Figure 5:
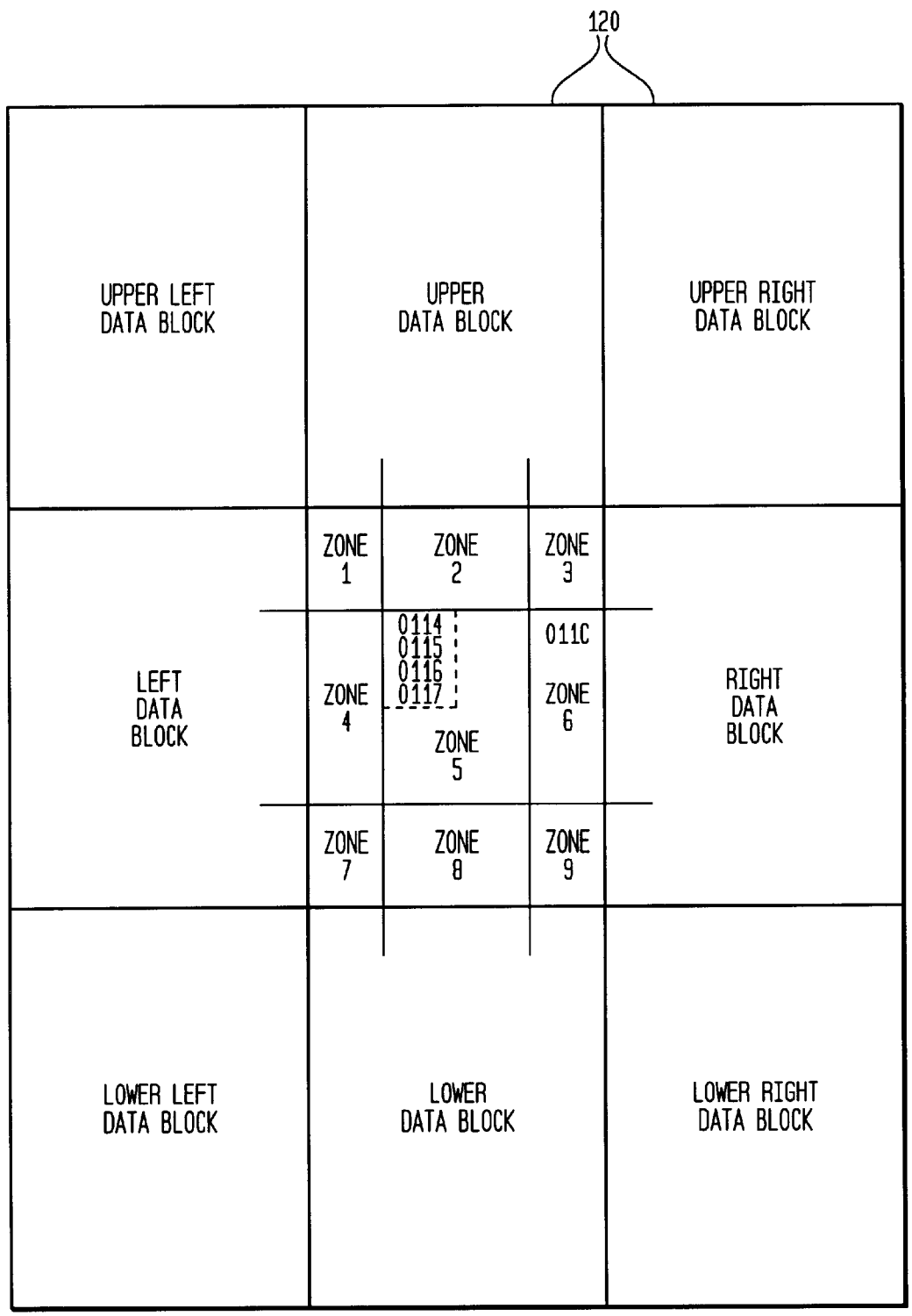
FIG. 5 illustrates still further conceptual details of the memory of FIG. 3.

With reference to FIG. 5, and by way of example, the central data block 120 is divided into nine zones, labeled zone 1–zone 9. Although FIG. 5 shows only the central data block 120 being partitioned into zones, the invention contemplates that any number of data blocks 120 are partitioned into zones and, preferably, that each data block 120 is so partitioned. In this example, zones 1, 3, 7, and 9 each contain one data unit 122; zones 2, 4, 6, and 8 each contain two data units 122; and zone 5 contains four data units 122.

At action 206 (FIG. 2), each of at least some of the zones within each data block 120, such as the central data block 120 shown in FIG. 5, is associated with one of the adjacent data blocks 120 to the central data block 120. For example, in accordance with one aspect of the present invention, zone 2 is preferably associated with the upper data block 120, zone 4 is preferably associated with the left data block 120, zone 6 is preferably associated with the right data block 120, and zone 8 is preferably associated with the lower data block 120. Zones 1, 3, 7, and 9 of the central data block 120 are preferably not associated with any of the adjacent data blocks 120. Likewise, zone 5 of the central data block 120 is preferably not associated with any of the adjacent data blocks 120. The rational for this association (and/or lack thereof) will be discussed in more detail later in this description.

At action 208 (FIG. 2), the processor 102 preferably generates an access request (e.g., an address to one or more bytes of data). As discussed above, this byte of data is located in a data unit 122 within a zone of a data block 120.

The access request is preferably provided to the address register 104 and the memory controller 110 (action 208). The memory controller 110 preferably makes a determination as to whether or not the access request matches any one of a plurality of cache tags associated with the cache lines of the cache memory 114. If a cache hit results, i.e., if the access request matches data stored within the cache memory 114, then the desired byte of data is read from the cache memory 114 and provided to the processor 102 (and/or any other appropriate device or process).

In accordance with one or more further aspects of the present invention, the address register 104 preferably provides the access request (i.e., the address to the desired byte of data) to the address decoder 106. The address decoder 106 is preferably operable to decode the access request, i.e., decode the address of the desired byte of data, to determine in which zone the byte of data is located (action 210). For example, the address decoder 106 is preferably operable to analyze certain bits of the address when determining the zone in which the desired byte of data is located. This will now be described in more detail with reference to FIG. 6. The central data block 120 is shown divided into the nine zones, which are defined by a left boundary 130 (common with the adjacent left data block 120), a right boundary 132 (common with the adjacent right data block 120), an upper boundary 134 (common with the adjacent upper data block 120), and a lower boundary 136 (common with the adjacent lower data block 120). The zones are further defined by a left dividing line 140 extending from the upper boundary 134 to the lower boundary 136, a right dividing line also extending from the upper boundary 134 to the lower boundary 136, an upper dividing line 144 extending from the left boundary 130 to the right boundary 132, and a lower dividing line 146 also extending from the left boundary 130 to the right boundary 132.

In accordance with this example of the boundaries and dividing lines, zone 1 (an upper left zone) contains a single data unit 122 located between the left boundary 130, the upper boundary 134, the upper dividing line 144, and the left dividing line 140. Zone 2 (an upper zone) includes two data units 122 located between the upper boundary 134 and the upper dividing line 144. Zone 3 (an upper right zone) includes a single data unit 122 located between the right boundary 132, the upper boundary 134, the upper dividing line 144 and the right dividing line 142. Zone 4 (a left zone) includes two data units 122 located between the left boundary 130 and the left dividing line 140. Zone 5 (a central zone) contains four data units 122 located between the left, right, upper, and lower dividing lines 140, 142, 144, and 146. Zone 6 (a right zone) contains two data units 122 located between the right boundary 132 and the right dividing line 142. Zone 7 (a lower left zone) includes a single data unit 122 located between the left boundary 130 the lower boundary 136, the lower dividing line 146, and the left dividing line 140. Zone 8 (a lower zone) contains two data units 122, located between the lower boundary 136 and the lower dividing line 146. Lastly, zone 9 (a lower right zone) contains a single data unit 122 located between the right boundary 132, the lower boundary 136, the lower dividing line 146, and the right dividing line 142.

In keeping with the above example, the left dividing line 140, the right dividing line 142, the upper dividing line 144, and the lower dividing line 146 may be defined by certain bits of the addresses of the bytes of data stored within the central data block 120 (and, by extension, any of the data blocks 120). Indeed, the left dividing line 140 and the right dividing line 142 may be defined by (e.g., may be decoded from, and/or ascertained from) the third and second bits of the access request address. Similarly, the upper dividing line 144 and the lower dividing line 146 are defined by the fifth and fourth bits of the access request address. Those skilled in the art will appreciate that the particular bits of the address used to define or decode the perimeters of the respective zones will depend on the size of the data block 120, the size of a data unit 122, the byte size, and the position and trajectory of the dividing lines and boundaries.

In keeping with the above example, the address decoder 106 preferably analyzes bits 5, 4, 3, and 2 of the access request address to determine in which zone the desired byte of data is located (action 210, FIG. 2). At action 212, a determination is made as to whether the detected zone is associated with an adjacent data block 120. The pre-fetch address generator 108 is preferably operable to make this determination based on the associations made at action 206. By way of example, if the access request address is 011C (FIG. 5) the address decoder 106 preferably analyses the bits of the access request address and determines that the desired byte of data is located in zone 6. The pre-fetch address generator 108 preferably receives this information and determines whether zone 6 is associated with an adjacent data block 120. In keeping with the example discussed hereinabove, zone 6 is associated with the right data block 120. Consequently, the pre-fetch address generator 108 preferably generates a request to pre-fetch the right data block 120 from the main memory 112 to the cache memory 114 (action 214). If the zone determined by the address decoder 106 is not associated with an adjacent data block 120 (action 212), then the process flow preferably branches back to action 208 where a next access request is received from the processor 102.

With reference to FIG. 5, it is noted that zones 2, 4, 6, and 8 were associated with the upper data block 120, the left data block 120, the right data block 120, and the lower data block 120, respectively, based on certain assumptions. For example, it was assumed that the likelihood of a next access request into the upper data block 120 is high when a current access request is made for a byte of data located in zone 2 of the central data block 120. Similar assumptions were made concerning zone 4 vis-a-vis the left data block 120, zone 6 vis-a-vis the right data block 120, and zone 8 vis-a-vis the lower data block 120.

Further, it was assumed that it would be unlikely that a next access request outside of the central data block 120 would be made when a current access request was for a byte of data located in zone 5. Concerning zones 1, 3, 7, and 9, although there may be a likelihood that a next access request would be made into an adjacent data block 120, it was assumed to be equally likely that the adjacent data block 120 would be the left data block, the upper left data block, or the upper data block. Thus, an association of, for example, zone 1 with a given one of these adjacent data blocks 120 would not necessarily result in a higher cache hit rate. Of course, depending on the exigencies of the situation, associating zone 1, 3, 7, and/or zone 9 with one or more of the adjacent data blocks 120 might prove useful and, therefore, this is contemplated in accordance with further aspects of the present invention.

Figure 6:
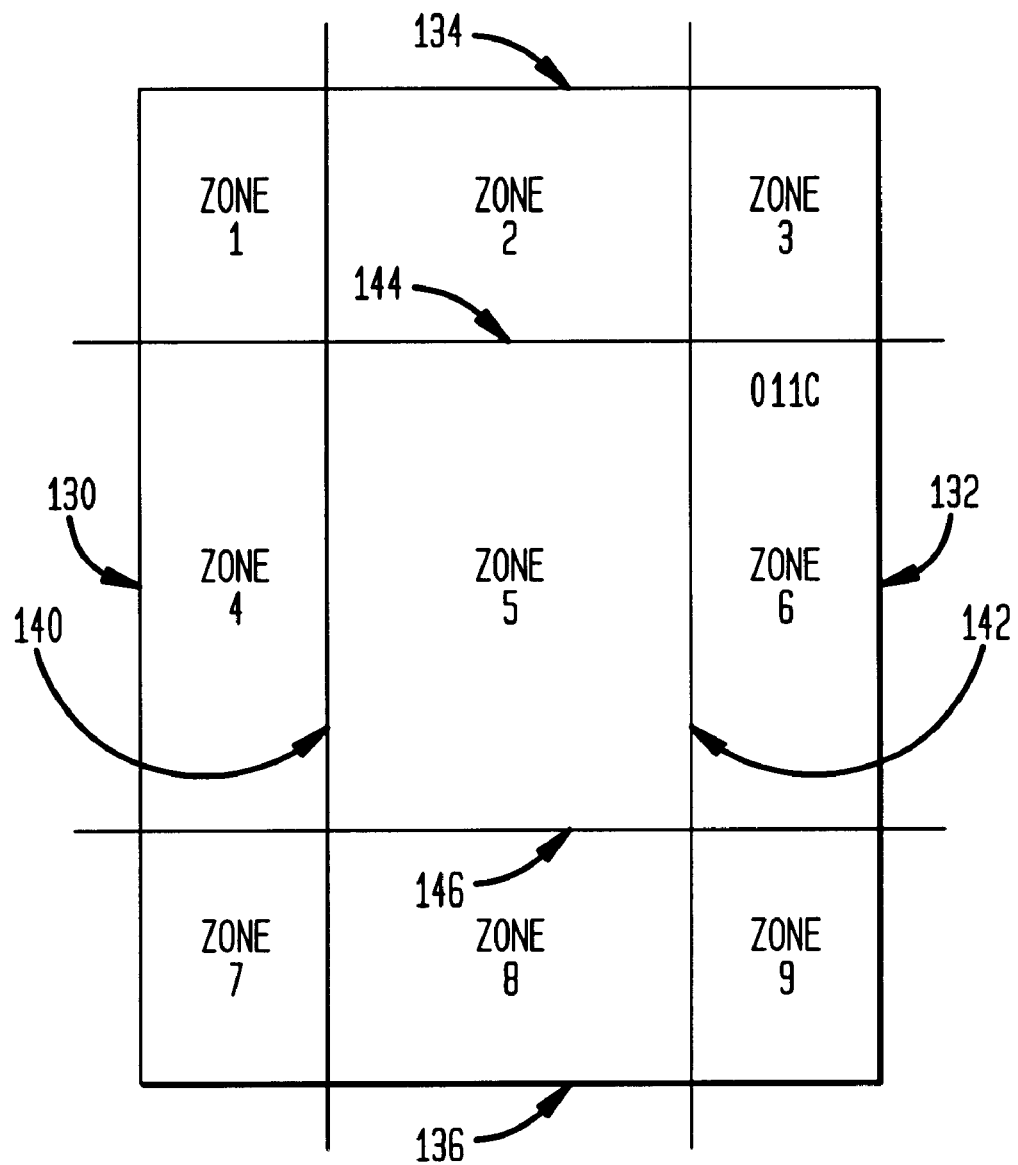
FIG. 6 illustrates further details of certain aspects of a data block of the memory of FIG. 3.
Figure 7A:
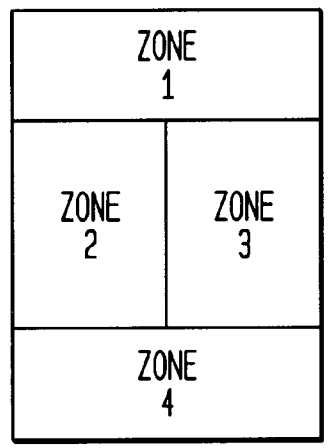
FIGS. 7A–7B illustrate alternative details to those shown in FIG. 5 concerning the control and/or implementation of a memory in accordance with one or more further aspects of the present invention.
Figure 7B:
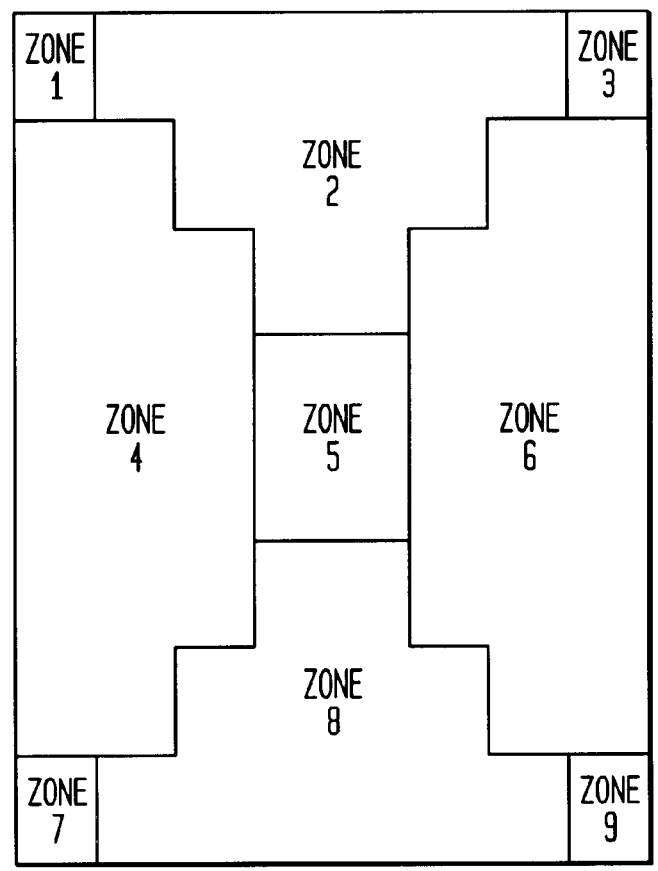

The particular zone configuration illustrated in FIGS. 5 and 6 is not required by the invention. Indeed, as illustrated in FIGS. 7A–7B further illustrations of alternative zone configurations are shown, where again these zone configurations are given by way of illustration only and are not intended to limit the scope of the invention.

In accordance with at least one further aspect of the present invention, the methods and apparatus for controlling the main memory 112 and cache memory 114 may be achieved utilizing suitable hardware, such as that illustrated in FIG. 1. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus 100 illustrated in FIG. 1 is shown as being partitioned into certain functional blocks, such blocks may be implemented by way of separate circuitry and/or combined into one or more functional units. Still further, the invention may be implemented by way of a software and/or firmware program that may be stored on a suitable storage medium (such as a floppy disk, a memory chip, etc.) for transportability and/or distribution.

Advantageously, the methods and apparatus for controlling a memory as described and claimed herein exploit the characteristics associated with the linearity and strong localities of memory used in, for example, graphics applications. Substantial increases in cache hits result and, therefore, improvements in memory efficiency, processing throughputs, and the quality of graphics images are obtained.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus for controlling a memory, comprising:
a main memory partitioned into a plurality of two-dimensional blocks, each given block including a plurality of data units containing one or more bytes of data, and each given block being partitioned into a plurality of zones, each zone containing one or more of the data units, and at least some of the respective ones of the zones being associated with respective blocks adjacent to the given block;
an address decoder operable to receive addresses to the bytes of data in the main memory, and to decode the addresses to determine in which zones the respective bytes of data are located; and
a pre-fetch address generator operable to generate a request to pre-fetch the blocks that are associated with respective zones into a cache memory when the address decoder receives addresses to bytes of data located in the respective zones.

2. The apparatus of claim 1, wherein:
each of the blocks includes at least one of: a left boundary common with a left adjacent block, a right boundary common with a right adjacent block, an upper boundary common with an upper adjacent block, and a lower boundary common with a lower adjacent block; and
each of the blocks includes at least one of: a left zone associated with the left adjacent block and including at least one data unit disposed along the left boundary, a right zone associated with the right adjacent block and including at least one data unit disposed along the right boundary, an upper zone associated with the upper adjacent block and including at least one data unit disposed along the upper boundary, and a lower zone associated with the lower adjacent block and including at least one data unit disposed along the lower boundary.

3. The apparatus of claim 2, wherein:
the left zone is defined at least in part by a left dividing line extending from the upper boundary to the lower boundary, the left zone including at least some of the data units located between the left boundary and the left dividing line;
the right zone is defined at least in part by a right dividing line extending from the upper boundary to the lower boundary, the right zone including at least some of the data units located between the right boundary and the right dividing line;
the upper zone is defined at least in part by an upper dividing line extending from the left boundary to the right boundary, the upper zone including at least some of the data units located between the upper boundary and the upper dividing line; and
the lower zone is defined at least in part by a lower dividing line extending from the left boundary to the right boundary, the lower zone including at least some of the data units located between the lower boundary and the lower dividing line.

4. The apparatus of claim 3, wherein the left, right, upper, and lower dividing lines correspond to certain bits of the addresses, and the address decoder is operable to decode the addresses to determine in which zones the respective data bytes are located based on the certain bits.

5. The apparatus of claim 3, wherein: each block includes a central zone containing the one or more data units located between the left, right, upper, and lower dividing lines; and the central zone is not associated with any adjacent block.

6. The apparatus of claim 3, wherein: each block includes at least one of:
an upper left zone containing the data units located between the left boundary, the upper boundary, the upper dividing line, and the left dividing line, where the upper left zone is not associated with any adjacent block;
a lower left zone containing the data units located between the left boundary, the lower boundary, the lower dividing line, and the left dividing line, where the lower left zone is not associated with any adjacent block;
an upper right zone containing the data units located between the right boundary, the upper boundary, the upper dividing line, and the right dividing line, where the upper right zone is not associated with any adjacent block; and
a lower right zone containing the data units located between the right boundary, the lower boundary, the lower dividing line, and the right dividing line, where the lower right zone is not associated with any adjacent block.

7. A method, comprising:
partitioning a main memory into a plurality of two-dimensional blocks, and partitioning each block into a plurality of data units containing one or more bytes of data;
partitioning each block of the main memory into a plurality of zones, each zone containing one or more of the data units;
associating respective ones of the zones of at least one of the blocks with respective ones of the blocks adjacent to the at least one block; and pre-fetching at least a portion of at least one of the associated blocks into a cache memory when one or more of the bytes of data of one of the data units within at least one of the respective zones is addressed.

8. A method, comprising:

partitioning a main memory into a plurality of two-dimensional blocks, and partitioning each block into a plurality of data units containing one or more bytes of data;

partitioning each block of the main memory into a plurality of zones, each zone containing one or more of the data units;

associating at least some of the respective ones of the zones of a given block with respective others of the blocks; and pre-fetching at least a portion of one of the respective others of the blocks into a cache memory when any one of the data units within the respective associated zone of the given block is addressed.

9. The method of claim 8, wherein each of the at least some zones of each given block is associated with one block adjacent to the given block.

10. The method of claim 9, wherein at least one zone of the given block is disposed along a boundary between the given block and an associated, adjacent block.

11. The method of claim 10, wherein the given block includes a respective zone disposed along each boundary of the given block and each associated, adjacent block.

12. A method, comprising:

partitioning a main memory into a plurality of two-dimensional rectangular blocks, each block being adjacent to at least one of the other blocks along a common boundary, and each block including a plurality of data units containing one or more bytes of data;

partitioning each block of the main memory into a plurality of zones, each zone containing one or more of the data units;

associating at least ones of the respective zones of a given block with respective others of the blocks adjacent to the given block; and pre-fetching a given one of the other blocks into a cache memory when any one of the data units within the respective zone associated of with that other block is addressed.

13. The method of claim 12, wherein:

each of the blocks includes at least one of: a left boundary common with a left adjacent block, a right boundary common with a right adjacent block, an upper boundary common with an upper adjacent block, and a lower boundary common with a lower adjacent block; and each of the blocks includes at least one of: a left zone associated with the left adjacent block and including at least one data unit disposed along the left boundary, a right zone associated with the right adjacent block and including at least one data unit disposed along the right boundary, an upper zone associated with the upper adjacent block and including at least one data unit disposed along the upper boundary, and a lower zone associated with the lower adjacent block and including at least one data unit disposed along the lower boundary.

14. The method of claim 13, wherein:

the left zone is defined at least in part by a left dividing line extending from the upper boundary to the lower boundary, the left zone including at least some of the data units located between the left boundary and the left dividing line;

the right zone is defined at least in part by a right dividing line extending from the upper boundary to the lower boundary, the right zone including at least some of the data units located between the right boundary and the right dividing line;

the upper zone is defined at least in part by an upper dividing line extending from the left boundary to the right boundary, the upper zone including at least some of the data units located between the upper boundary and the upper dividing line; and the lower zone is defined at least in part by a lower dividing line extending from the left boundary to the right boundary, the lower zone including at least some of the data units located between the lower boundary and the lower dividing line.

15. The method of claim 14, wherein: each block includes a central zone containing the one or more data units located between the left, right, upper, and lower dividing lines; and the central zone is not associated with any adjacent block.

16. The method of claim 14, wherein: each block includes at least one of:

an upper left zone containing the data units located between the left boundary, the upper boundary, the upper dividing line, and the left dividing line; and the upper left zone is not associated with any adjacent block;

a lower left zone containing the data units located between the left boundary, the lower boundary, the lower dividing line, and the left dividing line; and the lower left zone is not associated with any adjacent block;

an upper right zone containing the data units located between the right boundary, the upper boundary, the upper dividing line, and the right dividing line; and the upper right zone is not associated with any adjacent block; and a lower right zone containing the data units located between the right boundary, the lower boundary, the lower dividing line, and the right dividing line; and the lower right zone is not associated with any adjacent block.

* * * * *